(12) United States Patent
Maejima et al.

(10) Patent No.: US 6,266,123 B1
(45) Date of Patent: Jul. 24, 2001

(54) LIQUID CRYSTAL DISPLAY DEVICE AND MANUFACTURING METHOD THEREOF

(75) Inventors: Taro Maejima; Isao Sakata; Ikuo Ogo, all of Kikuchi-gun; Kazuo Yoshida; Yoshimi Kinoshita, both of Tokyo, all of (JP)

(73) Assignees: Advanced Display Inc., Kikuchi-gun; Mitsubishi Denki Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/338,429

(22) Filed: Jun. 23, 1999

(30) Foreign Application Priority Data

Jun. 26, 1998 (JP) .................................................. 10-180230
Jun. 26, 1998 (JP) .................................................. 10-180235

(51) Int. Cl.$^7$ .................................................. G02F 1/1333

(52) U.S. Cl. .......................... 349/160; 349/158; 349/187

(58) Field of Search ................................ 349/65, 73, 158, 349/160, 187

(56) References Cited

U.S. PATENT DOCUMENTS 4,470,668 * 9/1984 Inoue et al. ........................... 350/343
4,804,254 * 2/1989 Doll et al. ............................. 350/344

* cited by examiner

*Primary Examiner*—James A. Dudek
(74) *Attorney, Agent, or Firm*—Oblon, Spivak, McClelland, Maier & Neustadt, P.C.

(57) ABSTRACT

A liquid crystal display device comprising a liquid crystal display panel and a light guide plate arranged in a rear side of the liquid crystal display panel. The liquid crystal display panel is of a substantially spherical shape, and the liquid crystal display panel is fitted at a front side of the light guide plate such that a proximity of a central portion of the liquid crystal display panel is outwardly bulged. There can be prevented display deficiencies (paddling) owing to interference between the liquid crystal display panel and the backlighting unit or between the former and the casing. Moreover, since no interference exists between the liquid crystal display panel and the backlighting unit or between the former and the casing, sheets such as the diffusing sheet will not be wrinkled, and the brightness of the backlighting unit can be maintained to be uniform.

14 Claims, 12 Drawing Sheets

LIQUID CRYSTAL DISPLAY DEVICE AND MANUFACTURING METHOD THEREOF

BACKGROUND OF THE INVENTION

The present invention relates to a liquid crystal display device and a manufacturing method thereof. More particularly, it relates to a liquid crystal display device and a manufacturing method thereof which is capable of preventing display deficiencies owing to interference between a liquid crystal display panel and a backlighting unit (especially light guide plate) or between the former and a casing, and which is also capable of maintaining an uniform brightness for the backlighting unit.

Conventionally, liquid crystal display devices has been arranged with a backlighting unit 33 having a light guide plate 32 on a rear surface side of a liquid crystal display panel 31 as shown in FIG. 12 so that letters or images being displayed on the liquid crystal display panel can be clearly seen. Though not shown in the drawings, the liquid crystal display panel 31 and backlighting unit 33 are housed in the interior of the casing in a condition in which they are positioned by means of positioning covers.

As shown in FIG. 12, the liquid crystal display panel 31 is disposed in the front surface side of the light guide plate 32 being remote therefrom by a specified clearance with spacers 34 being interposed therebetween for cushioning. By the spacers 34, the liquid crystal display panel 31 can maintain a distance with respect to the light guide plate 32 and thus can be prevented from contacting the same.

The liquid crystal display panel 31 is so arranged that a spaced portion is formed by sealing peripheral edge portions of two flat transparent substrates 31a, 31b (which might be, for instance, made of glass) with a sealing member 31c, and liquid crystal (not shown) is enclosed into this spaced portion. A standard thickness for the transparent substrates 31a, 31b is approximately 0.7 to 1.1 mm.

The backlighting unit 33 is so arranged that an optical sheet such as a diffusing sheet and a reflective sheet (neither of them are shown in the drawing) are respectively adhered to or abutted against the front surface and rear surface of the light guide plate 32, and that a cold-cathode tube 35 is provided on a side surface of the light guide plate 32 to serve as a white color source.

In the liquid crystal display device as shown in FIG. 13 which is an example of a conventional liquid crystal display device having a frame and casing, a light guide plate 41 is housed in the interior of a frame 44 from a front surface thereof. The liquid crystal display panel 43 is disposed in the front surface side of the light guide plate 41 being remote therefrom by a specified clearance with spacers 47 being interposed therebetween for cushioning.

A frame 45 is disposed in the front surface side of the liquid crystal display panel 43 being remote therefrom by a specified clearance with spacers 48 being interposed therebetween for cushioning. The frame 45 covers an outer surface of the frame 44. Being supported by the frames 44, 45, the liquid crystal display panel 43 and light guide plate 41 are respectively positioned so as not to move in directions with respect to the surfaces, and are housed in the interior of a spaced portion surrounded by a casing of the display surface side 49 and a casing of the rear surface side 50.

The liquid crystal display panel 43 is so arranged that a spaced portion is formed by sealing peripheral edge portions of two flat glass substrates 43a, 43b with a sealing member 43c, and liquid crystal (not shown) is enclosed into this spaced portion. In order to bond the two glass substrates 43a, 43b by compression, thermosetting resin is applied onto a peripheral edge portion of a surface of either of the opposing surfaces of the glass substrates 43a, 43b, and four corners of the opposing surfaces of the glass substrates 43a, 43b are temporally fastened by using, for instance, UV curable resin. Thereafter, the glass substrates 43a, 43b are bonded through thermal compression wherein they are disposed on a surface plate which has been heated to approximately 100 to 180° C. and are applied with pressure.

Recently, liquid crystal display devices which are employed for notebook personal computers are required to be increasingly light-weighted, thin-sized, and low power consumption type, and very thin type liquid crystal display devices with a thickness of approximately 5.0 mm have been manufactured. There are known various methods for achieving thin-sizing such as eliminating covers for positioning or making transparent substrates thin. In these days, there have been manufactured liquid crystal display devices of very thin size which include thin and light-weighted light guide plates and transparent substrates. Especially the thickness of transparent substrates 31a, 31b that play a large role in whether light-weighted and thin-sized type products can be achieved are being decreased to approximately 0.5 to 0.6 mm.

However, in such very thin-sized liquid crystal display devices, there are employed liquid crystal display panels 31, 43 as shown in FIGS. 12 and 13 which are very thin and are apt to bending owing to their own weight. Simultaneously, spaces between the liquid crystal display panels 31, 43 and the backlighting unit 33 are also very narrow (see gaps G11, G12 between the liquid crystal display panels 31, 43 and the light guide plates 32, 41 in FIGS. 12 and 13). Therefore, the liquid crystal display panels 31, 43 are apt to partially contact the backlighting unit such as the light guide plates 32, 41 or other members such as the casing due to undulations in the light guide plates 32, 41 or bending in the transparent substrates 31a, 31b, 43a, 43b, and might consequently result in display deficiencies (so-called paddling) owing to interference. For instance, in case the liquid crystal display panels 31, 43 contact other members, gaps between substrates which enclose liquid crystal therein are varied and display deficiencies such as formation of wave-like patterns are generated.

Further, in case the liquid crystal display panels 31, 43 contact the backlighting unit 33, there might be generated wrinkles in sheets such as the diffusing sheet in the front surface side of the light guide plates 32, 41 which constitute the backlighting unit 33, and these wrinkles might cause partial darkening of light of the backlighting unit 33.

The present invention has been made to solve these problems, and it is an object of the present invention to provide a liquid crystal display devices and a manufacturing method thereof which is capable of preventing display deficiencies owing to interference between a liquid crystal display panel and a backlighting unit (especially light guide plate) or between the former and a casing, and which is also capable of maintaining an uniform brightness for the backlighting unit.

SUMMARY OF THE INVENTION

In accordance with a first aspect of the present invention, there is provided is a liquid crystal display device comprising a liquid crystal display panel and a light guide plate arranged in a rear side of the liquid crystal display panel, wherein the liquid crystal display panel is of a substantially spherical shape, and the liquid crystal display panel is fitted at a front side of the light guide plate such that a proximity of a central portion of the liquid crystal display panel is outwardly bulged.

It is preferable that the proximity of the central portion of the liquid crystal display panel is outwardly bulged by approximately 0.1 to 1.0 mm.

It is preferable that a notched portion is formed in a peripheral edge portion in the front side of the light guide plate for fitting the liquid crystal display panel thereat.

It is preferable that a portion at which the liquid crystal display panel and the notched portion of the light guide plate are fitted is adhered together.

In accordance with a second aspect of the present invention, there is provided a manufacturing method for a liquid crystal display device comprising device comprising a liquid crystal display panel and a light guide plate arranged in a rear side of the liquid crystal display panel, comprising the steps of
  (a) making the liquid crystal display panel shrink by cooling and/or making the light guide plate expand by heating,
  (b) fitting the liquid crystal display panel at a front side of the light guide plate, and
  (c) making a proximity of a central portion of the liquid crystal display panel bulge outwardly by returning the liquid crystal display panel and the light guide plate to room temperature.

In accordance with a third aspect of the present invention, there is provided a manufacturing method for a liquid crystal display device comprising a liquid crystal display panel and a light guide plate arranged in a rear side of the liquid crystal display panel, comprising the steps of
  (a) fitting the liquid crystal display panel at a front side of the light guide plate in a flat condition, and
  (b) making a proximity of a central portion of the liquid crystal display panel bulge outwardly by applying external force by a mechanical element from a peripheral edge portion of the liquid crystal display panel.

In accordance with a fourth aspect of the present invention, there is provided a manufacturing method for a liquid crystal display device comprising a liquid crystal display panel and a light guide plate arranged in a rear side of the liquid crystal display panel, comprising the steps of
  (a) fitting the liquid crystal display panel at a front side of a light guide plate in a flat condition such that a closed spaced portion is formed between the liquid crystal display panel and the light guide plate, and
  (b) making a proximity of a central portion of the liquid crystal display panel bulge outwardly by applying pressure to the spaced portion through putting a gas therein.

In accordance with a fifth aspect of the present invention, there is provided a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein
  the liquid crystal display panel is of a substantially spherical shape, and
  a proximity of a central portion of the liquid crystal display panel is outwardly bulged.

It is preferable that the proximity of the central portion of the liquid crystal display panel is outwardly bulged by not more than approximately 0.2 mm.

In accordance with a sixth aspect of the present invention, there is provided a manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are bonded by compression by being pressed onto a pressing plate of which central portion is bulged to obtain a liquid crystal display panel of substantially spherical shape, and the liquid crystal display panel is so disposed as to be bulged to outside a casing.

In accordance with a seventh aspect of the present invention, there is provided a manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are placed on a flat shaped pressing plate and are bonded by compression by being pressed in an upward direction by a pin through a piercing hole formed on the pressing plate to obtain a liquid crystal display panel of substantially spherical shape, and the liquid crystal display panel is so disposed as to be bulged to outside a casing.

In accordance with a eighth aspect of the present invention, there is provided a manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are positioned in a sealed sack to be pressed to each other with the interior of the sack being in a substantially vacuum condition, the array substrate and the color filter substrate are made to bow downwardly by their own weight to obtain a liquid crystal display panel, and in that the liquid crystal display panel is so disposed as to be bulged to outside a casing.

In accordance with a ninth aspect of the present invention, there is provided a manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are positioned in a sealed sack to be pressed to each other with the interior of the sack being in a substantially vacuum condition, the array substrate and the color filter substrate are made to bow upwardly by means of a pin to obtain a liquid crystal display panel, and the liquid crystal display panel is so disposed as to be bulged to outside a casing.

In accordance with a tenth aspect of the present invention, there is provided a manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are positioned in a sealed sack to be pressed to each other with the interior of the sack being in a substantially vacuum condition, the array substrate and the color filter substrate are respectively heated or cooled at different temperatures such that the array substrate and the color filter substrate are made to bow using the temperature differences to obtain a substantially spherical shaped liquid crystal display panel, and the liquid crystal display panel is so disposed as to be bulged to outside a casing.

DETAILED DESCRIPTION

First, the liquid crystal display device and manufacturing methods thereof as shown in FIGS. 1 to 6 will be explained.

Figure 1:
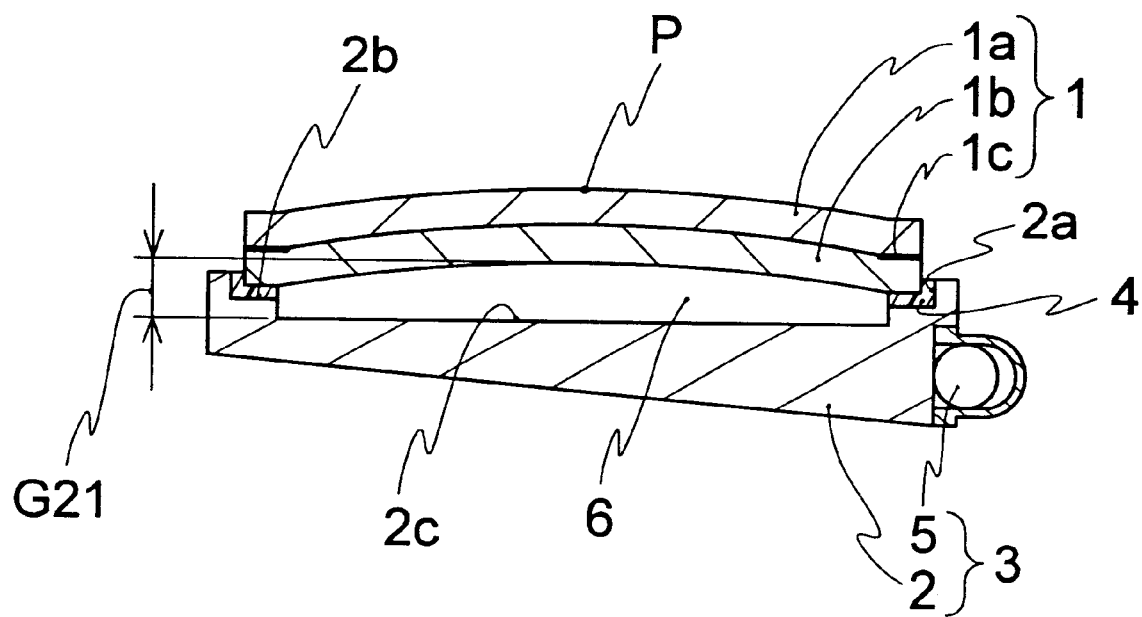
FIG. 1 is a sectional, explanatory view showing a liquid crystal display device according to one embodiment of the present invention.
Figure 2:
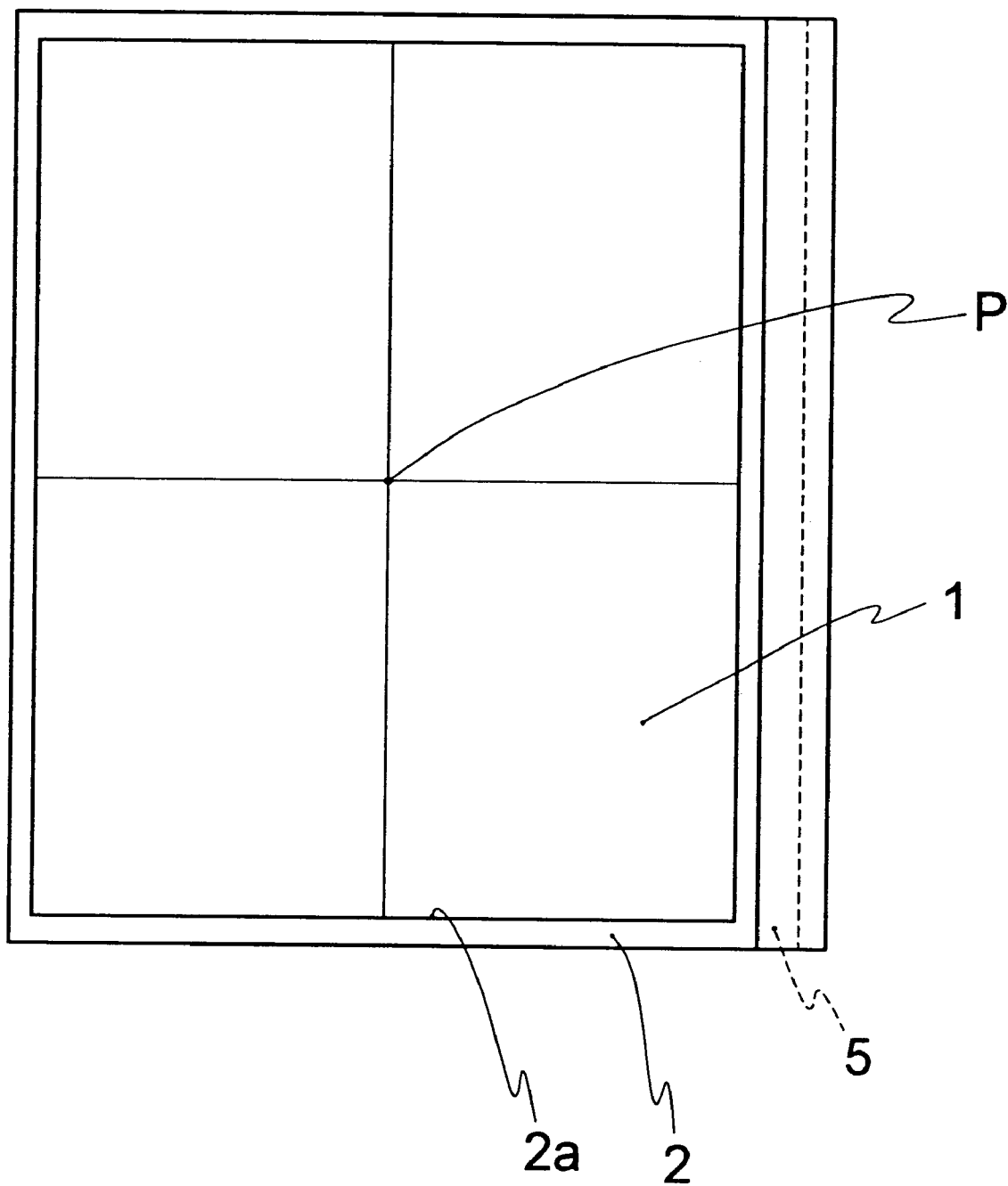
FIG. 2 is a plan view of the liquid crystal display device of FIG. 1.

The liquid crystal display device according to this embodiment as shown in FIGS. 1 and 2 is so arranged that a liquid crystal display panel 1 has been changed into a substantially spherical shape such that no display deficiencies (paddling) are generated by interference between the liquid crystal display panel 1 and other members such as a light guide plate 2 of a backlighting unit 3.

The liquid crystal display device 1 in FIG. 1 is so arranged that the backlighting unit 3 having the light guide plate 2 is disposed in the rear surface side of the liquid crystal display panel 1. Though not shown in the drawings, the liquid crystal display panel 1 and the backlighting unit 3 are housed in the interior of a casing in a condition in which they are positioned by means of positioning covers.

Figure 3:
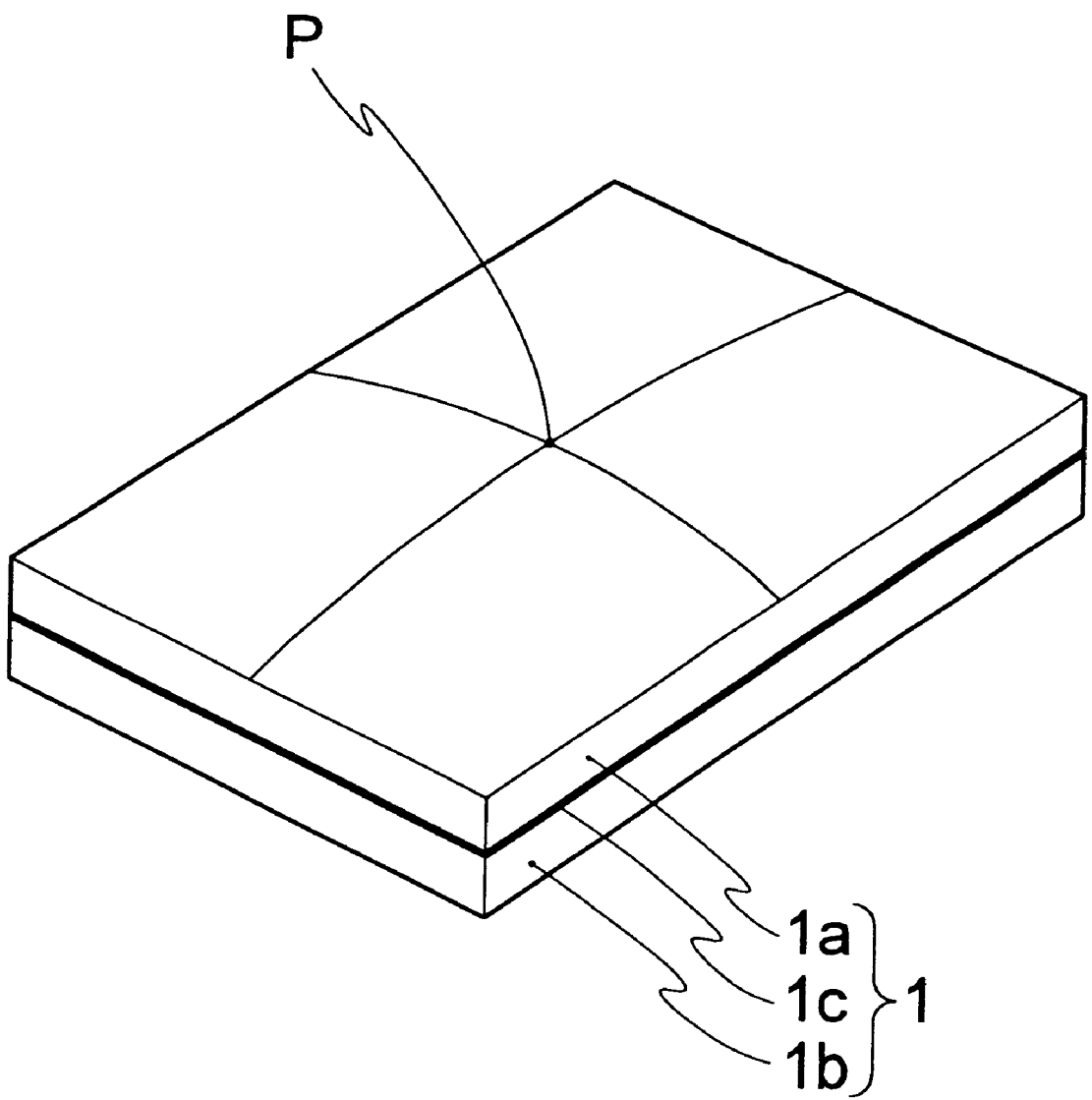
FIG. 3 is a perspective, explanatory view of a liquid crystal display panel of FIG. 1.

As shown in FIGS. 1 to 3, in the liquid crystal display panel 1, there is formed a spaced portion by sealing peripheral edge portions of two flat transparent substrates which are an array substrate 1a and a color filter substrate 1b with a sealing member 1c, and liquid crystal (not shown) is enclosed into this spaced portion. The array substrate 1a and the color filter substrate 1b are manufactured, for instance, of glass or acrylic materials. In this description, array substrate 1a denotes a substrate being formed with, on at least a part of the surface of the substrate, a circuit such as TFT array, and color filter substrate 1b a substrate being formed with, on at least a part of the surface of the substrate, a color filter.

Since the liquid crystal display panel 1 is of a substantially spherical shape, the panel 1 is disposed such that a proximity of a central portion P of the liquid crystal display panel 1 is outwardly bulged. Thus, the distance with respect to light guide plate 2 (see gap G21 between the liquid crystal display panel 1 and the light guide plate 2 in FIG. 1) is largest at the central portion P, whereby interference with respect to the backlighting unit such as the light guide plate 2 or to the casing can be reliably prevented. Moreover, since the peripheral edge portion of the liquid crystal display panel 1 lies substantially on a same plane, the liquid crystal display panel 1 can be easily disposed at a notched portion 2a of the light guide plate 2 without any space formed between.

The backlighting unit 3 is so arranged that an optical sheet such as a diffusing sheet and a reflective sheet (neither of them are shown in the drawings) are respectively adhered to or abutted against the front surface and rear surface of the light guide plate 2, and that a cold-cathode tube 5 is provided on a side surface of the light guide plate 2 to serve as a white color source.

It is preferable that the proximity of the central portion P of the liquid crystal display panel 1 is outwardly bulged by approximately 0.1 to 1.0 mm (and preferably by approximately 0.1 to 0.5 mm) in view of the possibility that interference might occur between the panel and a body of the personal computer such as a keyboard if it is excessively bulged outwardly.

The provision of the notched portion 2a in the peripheral edge portion in the front side of the light guide plate 2 at which the liquid crystal display panel 1 is fitted makes it possible that the liquid crystal display panel 1 is firmly fitted at the light guide plate 2 and is hardly separated therefrom.

Further, since the notched portion 2a is formed such that a bottom surface 2b of the notched portion 2a is located somewhat upward than a main surface 2c of the light guide plate 2, gap G21 between the liquid crystal display panel 1 and the light introducing plate 2 can be secured to be sufficiently large.

Moreover, since the portion at which the liquid crystal display panel 1 and the notched portion 2a of the light guide plate 2 are fitted together is adhered at an adhesive layer 4, the liquid crystal display panel 1 and the light introducing plate 2 are made still harder to separate. Also, the spaced portion 6 between the liquid crystal display panel 1 and the light guide plate 2 can be closed up in an airtight manner.

A suitable adhesive employed as the adhesive layer 4 might be one suitable for adhering glass or resin, examples of which are those of cemedine group, acrylic group or rubber group.

The liquid crystal display device shown in FIG. 1 is manufactured by the following manufacturing methods.

Figure 4:
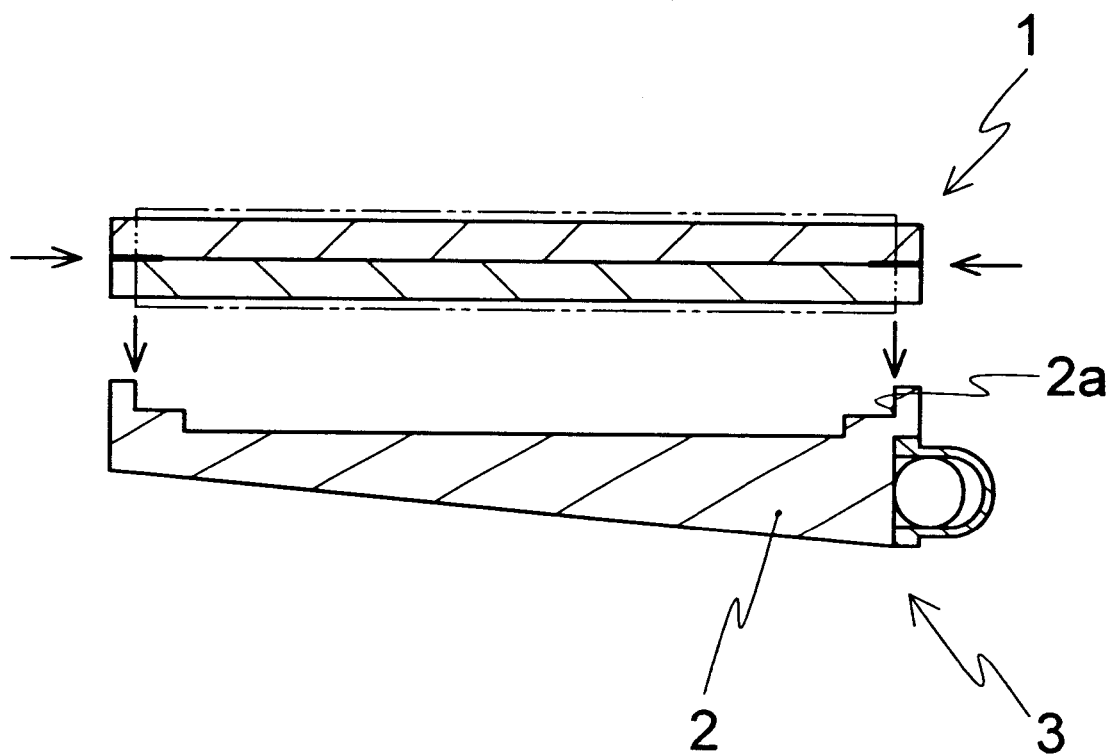
FIG. 4 is a sectional, explanatory view of processes according to one embodiment of a manufacturing method of a liquid crystal display device according to the second aspect of the present invention.

In a first manufacturing method as shown in FIG. 4, a liquid crystal display panel 1 is made to shrink through cooling, the liquid crystal display panel 1 is then fitted at a notched portion 2a of a light guide plate 2. Thereafter, by making the liquid crystal display panel 1 return to room temperature, the proximity of a central portion of the liquid crystal display panel 1 is made to bulge outwardly to obtain a liquid crystal display device.

Since the liquid crystal display panel 1 is made to shrink through cooling in the first manufacturing method, it is presented an advantage that the liquid crystal display panel 1 can be easily fitted at the light guide plate 2 and adjustments after the fitting is made easy.

It should be noted that the same effects as explained above can be obtained by replacing the step of cooling the liquid crystal display panel 1 with the step of heating the light guide plate 2 wherein the liquid crystal display panel 1 is fitted at the light guide plate 2 which is in an expanded condition and the light guide plate 2 is made to return to room temperature. Further, the same applies in the case where cooling of the liquid crystal display panel 1 and heating of the light guide plate 2 are performed simultaneously.

The cooling temperature for the liquid crystal display panel 1 in the first method is preferably set to not more than −30° C. with which a range of reliability that is tolerable in a reliability test after manufacturing the liquid crystal display apparatus is hardly missed (that is, high reliability can be achieved). Further, the heating temperature for the light guide plate 2 is preferably set to not less than 60° C. with which a range of reliability that is tolerable in a reliability test after manufacturing the liquid crystal display apparatus is hardly missed (that is, high reliability can be achieved). When cooling of the liquid crystal display panel 1 and heating of the light guide plate 2 are simultaneously performed, the temperature difference between the cooling temperature for the liquid crystal display panel 1 and heating temperature for the light guide plate 2 is preferably set to not less than 80° C. with which a range of reliability that is tolerable in a reliability test after manufacturing the liquid crystal display apparatus is hardly missed (that is, high reliability can be achieved).

Figure 5:
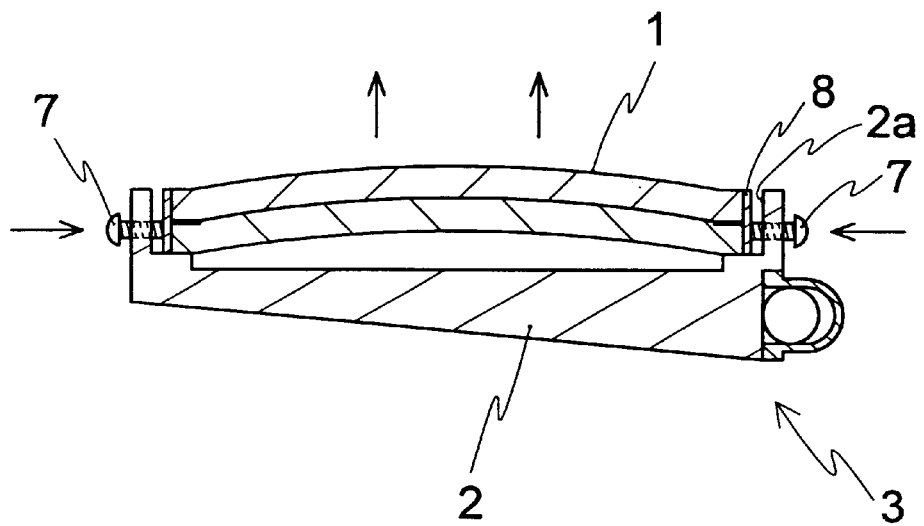
FIG. 5 is a sectional, explanatory view of processes according to one embodiment of a manufacturing method of a liquid crystal display device according to the third aspect of the present invention.

Next, in a second manufacturing method as shown in FIG. 5, the liquid crystal display panel 1 is fitted at the notched portion 2a of the light guide plate 2 in a flat condition, and by applying external force onto the peripheral edge portion of the liquid crystal display panel 1 by means of a mechanical element, for instance, by fastening a screw 7, the liquid crystal display device can be obtained by making the proximity of the central portion of the liquid crystal display panel 1 bulge outwardly. The screw 7 might be fastened to the liquid crystal display panel 1 with or without a placing plate 8 pinched therebetween.

As for the mechanical element, there might be alternatively employed a lever instead of the screw 7.

Since the liquid crystal display panel 1 is fastened by means of a mechanical element in the second manufacturing method, the liquid crystal display panel 1 can be easily fitted at the light guide plate 2 and the liquid crystal display panel 1 can further be accurately deformed into a substantially spherical shape of a specified curvature. With this arrangement, there can be provided an advantage that a dimensional tolerance (cutting tolerance) can be easily absorbed.

Figure 6:
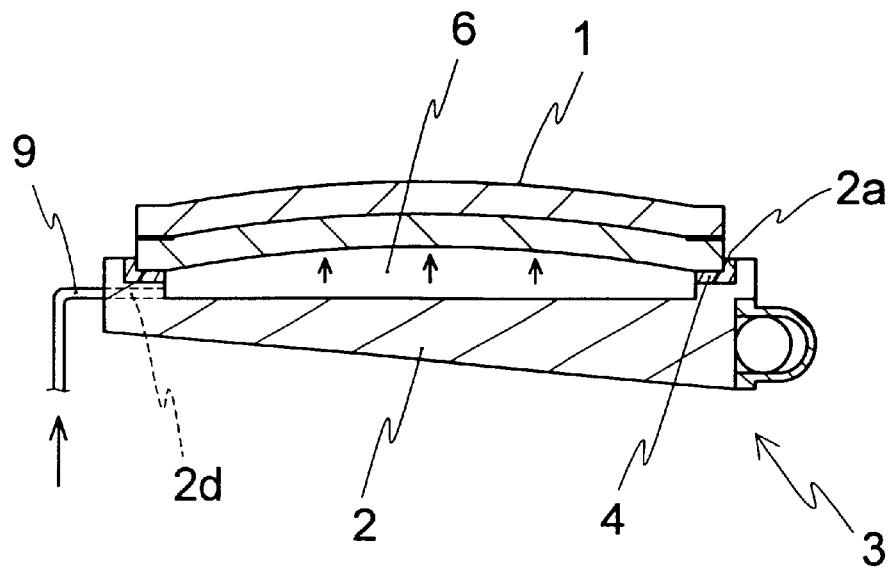
FIG. 6 is a sectional, explanatory view of processes according to one embodiment of a manufacturing method of a liquid crystal display device according to the fourth aspect of the present invention.

Further, in a third manufacturing method as shown in FIG. 6, the liquid crystal display panel 1 is fitted and further adhered, by means of a adhesive layer 4, to the notched portion 2a in the front side of the light guide plate 2 in a flat condition such that a closed spaced portion 6 is formed between the liquid crystal display panel 1 and the light guide plate 2, and the proximity of the central portion of the liquid crystal display panel 1 is made to bulge outwardly by applying pressure to the spaced portion 6 by putting a gas therein, whereby the liquid crystal display device can be obtained.

A gas is supplied to the spaced portion 6 via an introducing hole 2d formed in the light guide plate 2 and a supply tube 9 connected to this introducing hole 2d.

As for the gas which is supplied, air, nitrogen, or dry air might be employed. Nitrogen or dry air is especially preferable in view of their hardly dewing characteristics.

The supplying pressure for the gas might preferably set to approximately 0.01 to 0.5 kgf/m$^2$ (0.098 to 0.49 Pa) in view of destruction or the like.

When pressurizing is performed using a gas, the fitting operation of the liquid crystal display panel 1 at the light guide plate 2 is performed at a room temperature, and after completion of fitting, the liquid crystal display panel 1 might be adhered to the light guide plate 2.

The introducing hole 2d for the gas might be sealed, after completion of gas enclosure, by means of UV curable resin or the like.

Since the liquid crystal display panel 1 is made to bulge outwardly by utilizing the pressure of a gas, bending of the liquid crystal display panel 1 can be effectively prevented by the effect of uniform pressure acting on substantially overall the liquid crystal display panel 1, and since an outwardly returning force against the external force constantly actuates, there can be presented an advantage that the reliability of the product is high.

As explained above, the liquid crystal display panel 1 shall be compressed such that it always forms a convex shape in an outward direction. For instance, the outer surface of the liquid crystal display panel 1 might be lifted outwardly by being sucked by a pad, or after fitting the light guide plate 2 at the liquid crystal display panel 1, the liquid crystal display panel 1 may be bend outwardly by its own weight.

Further, in case of deforming the liquid crystal display panel 1 in a substantially spherical shape, the peripheral edge of the liquid crystal display panel 1 is made to lie in a same plane.

In case a liquid crystal display device is to be manufactured as discussed above, it is required to cut transparent substrates constituting the liquid crystal display panel 1 each by each, and selection of combinations (so-called matching) of light guide plates and transparent substrates is performed such that relationships of sizes are achieved at which the liquid crystal display panels are of substantially spherical shapes of a specified curvature. The matching operation is performed in the following manner: sizes of transparent substrates are measured at high accuracy in units of 1/100 mm or 1/1,000 mm; sizes of inner sizes of notched portions of light guide plates are similarly measured at high accuracy; identification numbers are allotted to each of the transparent substrates and light guide plates; and matching is performed from among data groups of respective sizes for the transparent substrates and light guide plates such that specified relationships of sizes are obtained.

In the above described manufacturing method, it has been explained for a case in which the array substrate 1a is disposed on a upper side, the color filter substrate 1b on an lower side, and the color filter substrate 1b on an inner side. However, the present invention is not limited to this, and the arrangement may be reversed in which case bending is performed in a reverse direction. That is, the array substrate 1a may be in the lower side, the color filter substrate 1b in the upper side, and the array substrate 1a may be disposed on the inner side.

Next, the liquid crystal display device as shown in FIGS. 7 to 11 and manufacturing methods thereof will be explained.

Figure 7:
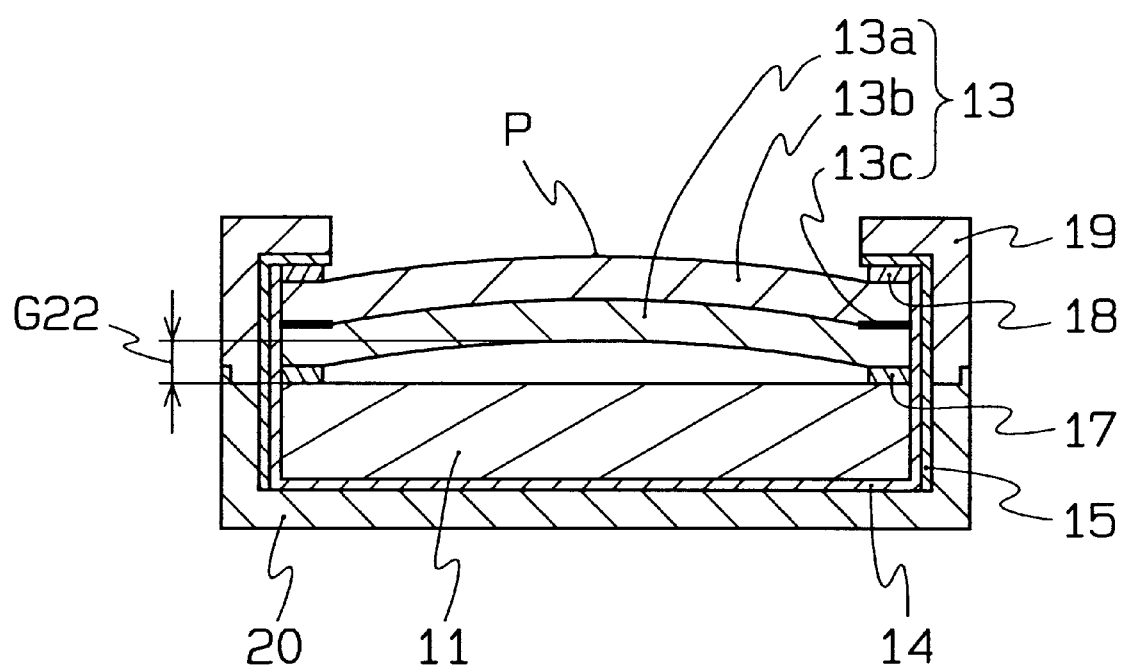
FIG. 7 is a sectional, explanatory view of a liquid crystal display device according to another embodiment of the present invention.
Figure 8:
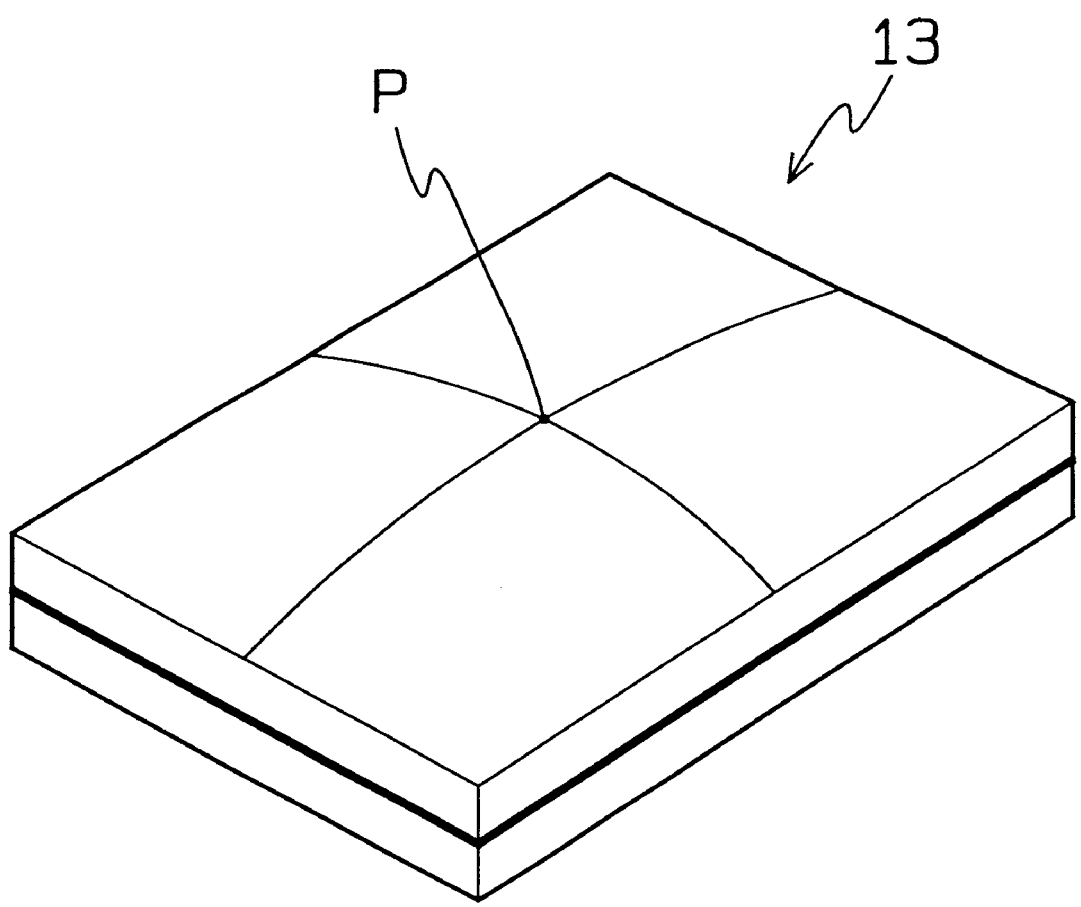
FIG. 8 is a perspective, explanatory view of a liquid crystal display panel of FIG. 7.

The liquid crystal display device according to this embodiment as shown in FIGS. 7 and 8 is so arranged that a liquid crystal display panel 13 is arranged in a substantially spherical shape such that no display deficiencies (paddling) are generated by interference between the liquid crystal display panel 13 and other members such as a backlighting unit.

As shown in FIG. 7, a light guide plate 11 is housed in the interior of a frame 14 from a front side thereof. An optical sheet such as a diffusing sheet and a reflective sheet (neither of them are shown in the drawings) are respectively adhered to or abutted against the front surface and rear surface of the light guide plate 11. The liquid crystal display panel 13 is disposed in the front surface side of the light guide plate 11 being remote therefrom by a specified clearance with spacers 17 being interposed therebetween for cushioning.

The liquid crystal display panel 13 is so arranged that a spaced portion is formed by sealing peripheral edge portions of two glass substrates of substantially spherical shapes which are an array substrate 13a and a color filter substrate 13b with a sealing member 13c, and liquid crystal (not shown) is enclosed into this spaced portion. In this description, array substrate 13a denotes a substrate being formed with, on at least a part of the surface of the substrate, a circuit such as TFT array, and color filter substrate 13b a substrate being formed with, on at least a part of the surface of the substrate, a color filter.

Since the liquid crystal display panel 13 is of a substantially spherical shape, a proximity of a central portion P of the liquid crystal display panel 13 is arranged to be outwardly bulged. Thus, the distance with respect to light guide plate 11 (see gap G22 between the liquid crystal display panel 13 and the light guide plate 11 in FIG. 7) is largest at the central portion P, whereby interference with respect to the backlighting unit such as the light guide plate 11 or to the casing can be reliably prevented. Moreover, since the peripheral edge portion of the liquid crystal display panel 13 lies substantially on a same plane, the liquid crystal display panel 13 can be easily disposed, similarly to conventional liquid crystal display devices, at a metallic frame 14 or the like without any space formed therebetween.

The proximity of the central portion P of the liquid crystal display panel 13 is preferably bulged outwardly by not more than approximately 0.2 mm (and preferably, not more than approximately 0.05 mm) in order to prevent interference with backlighting unit (more particularly the light guide plate 11).

Further, a frame 15 is disposed in the front surface side of the liquid crystal display panel 13 being remote therefrom by a specified clearance with spacers 18 being interposed therebetween for cushioning. The frame 15 covers an outer surface of the frame 14. Being supported by the frames 14, 15, the liquid crystal display panel 13 and light guide plate 11 are respectively positioned so as not to move in inward directions with respect to the surfaces, and are housed in the interior of a spaced portion surrounded by a casing of the display surface side 19 and a casing body of the rear surface side 20.

The liquid crystal display device as shown in FIG. 7 is manufactured by the following manufacturing methods.

Figure 9A:
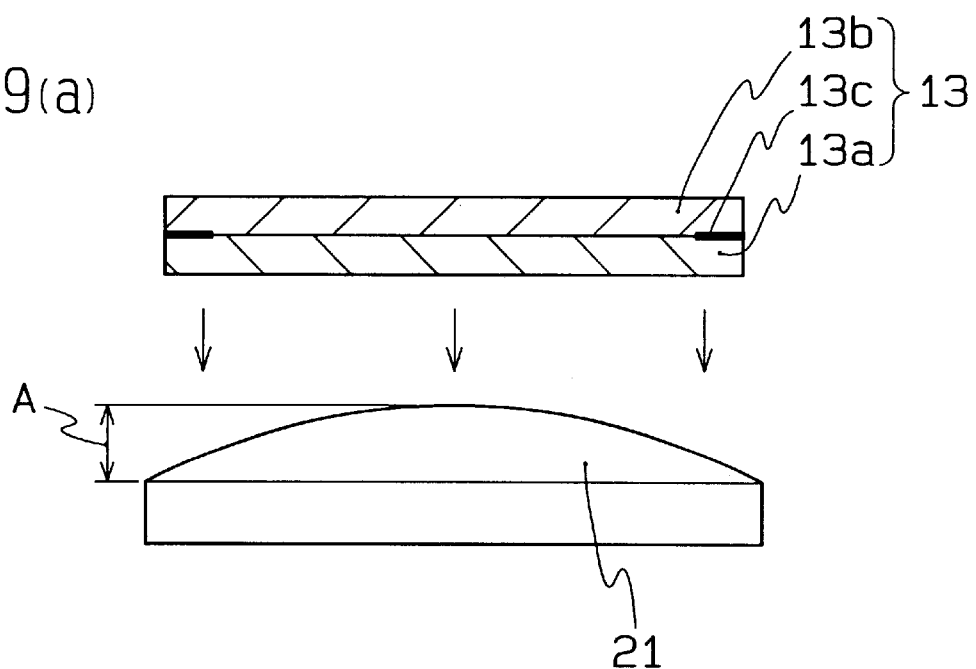
FIGS. 9a–9b is a sectional, explanatory view of processes according to one embodiment of a manufacturing method of a liquid crystal display device according to the sixth aspect of the present invention.
Figure 9B:
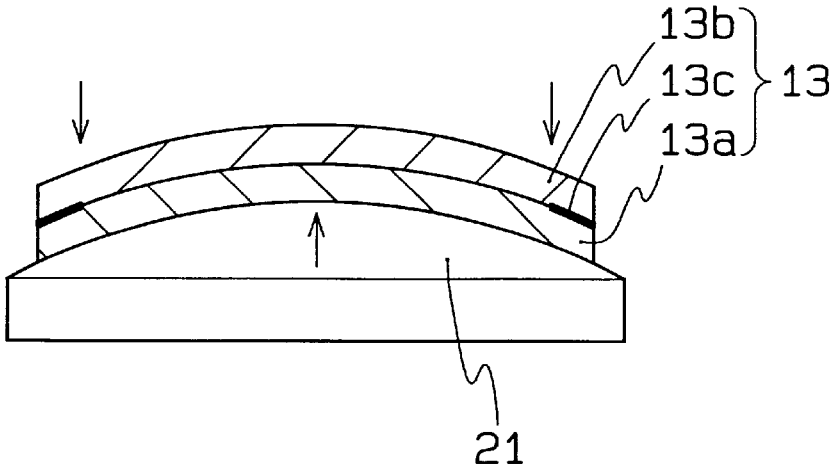

In the first manufacturing method shown in FIG. 9, the array substrate 13a and the color filter substrate 13b are bonded by being pressed onto a pressing plate (surface plate) 21 of which central portion is bulged to obtain the liquid crystal display panel 13 of substantially spherical shape. Thereafter, by arranging the liquid crystal display panel 13 as well as the light guide plate 11 and the spacers 17, 18 in an outwardly bulged manner with respect to a casing composed of casings 19, as shown in FIG. 7, the liquid crystal display device of FIG. 7 can be obtained. It should be noted that in case the liquid crystal display panel 13 is to be deformed into a substantially spherical shape by means of the pressing plate 21, the peripheral edge of the liquid crystal display panel 13 is made to lie substantially in a same plane.

In case thermal compression is performed by using the pressing plate (surface plate) 21, thermosetting resin is applied onto a peripheral edge portion of a surface of either of the opposing surfaces of the array substrate 13a and the color filter substrate 13b, and four corners of the opposing surfaces of the substrates 13a, 13b are temporally fastened by using, for instance, UV curable resin. Thereafter, the substrates 13a, 13b are bonded through thermal compression wherein they are disposed on the upwardly extruding pressing plate (surface plate) 21 that has been heated to approximately 100 to 180° C. and are applied with pressure.

The pressing plate 21 is an upwardly extruding member and is preferably made of stainless steel to enable performance of highly accurate control. In addition, a preferable amount of extrusion A for the pressing plate 21 (see FIG. 9) is approximately set to 50 to 200 μm. Further, in case of a liquid crystal display panel 13 of 12.1 inches size (a rectangle of approximately 200 mm in height and 275 mm in width), the amount of extrusion A is preferably set to 20 to 200 μm.

It should be noted that the substantially spherical shaped liquid crystal display panel 13 as shown in FIG. 9 can be obtained also by performing compression without heating but by employing UV curable resin instead of performing thermal compression.

Figure 10A:
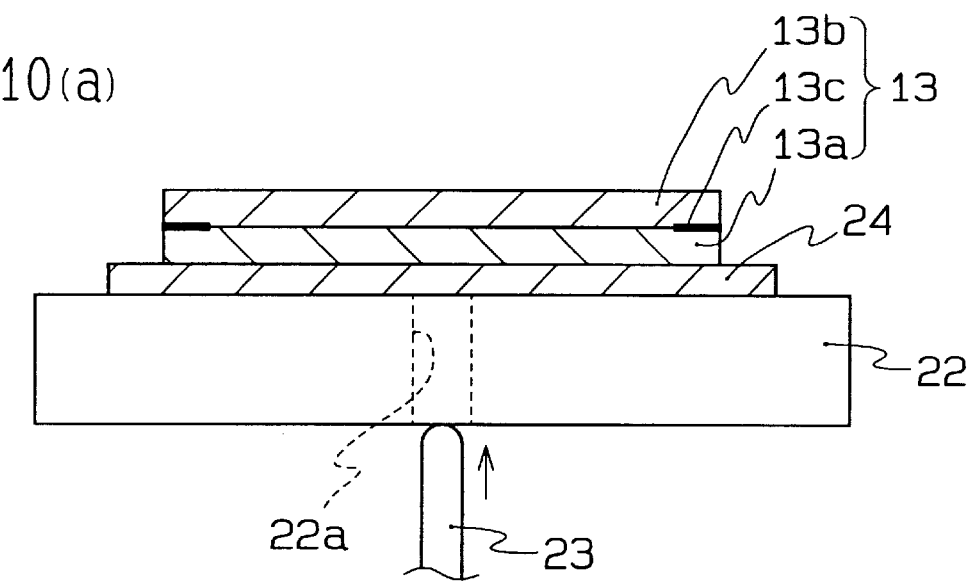
FIGS. 10a–10b is a sectional, explanatory view of processes according to one embodiment of a manufacturing method of a liquid crystal display device according to the seventh aspect of the present invention.
Figure 10B:
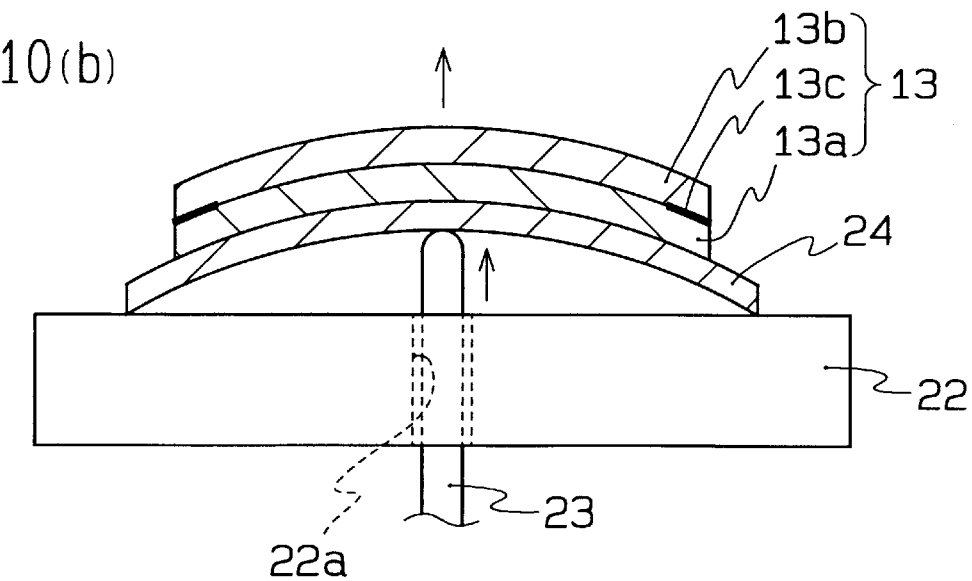

Next, in a second manufacturing method shown in FIG. 10, the array substrate 13a and the color filter substrate 13b are placed on a flat shaped pressing plate 22 and are bonded by being pressed in an upward direction by a pin 23 through a piercing hole 22a formed on the pressing plate 22 to obtain a liquid crystal display panel 13 of substantially spherical shape 13. Thereafter, by arranging the liquid crystal display panel 13 as well as the light guide plate 11 and the spacers 17, 18 in an outwardly bulged manner with respect to a casing composed of casings 19, 20 as shown in FIG. 7, the liquid crystal display device of FIG. 7 can be obtained. It should be noted that in case the liquid crystal display panel 13 is to be deformed into a substantially spherical shape by means of the pressing plate 22, the peripheral edge of the liquid crystal display panel 13 is made to lie substantially in a same plane.

Since a graphite substrate 24 is interposed between the pin 23 and the liquid crystal display panel 13 in the case as shown in FIG. 10, concentrated load by the pin 23 is dispersed by the graphite substrate 24 being pushed upward by the pin 23, whereby a substantially spherical shaped liquid crystal display panel 13 can be obtained.

It should be noted that the liquid crystal display panel 13 can be similarly formed to assume a substantially spherical shape by pushing the liquid crystal display panel 13 up by means of a plate instead of the pin.

In the second manufacturing method shown in FIG. 10, both, thermal compression and pressing without applying heat but by using UV curavble resin can be employed.

Figure 11A:
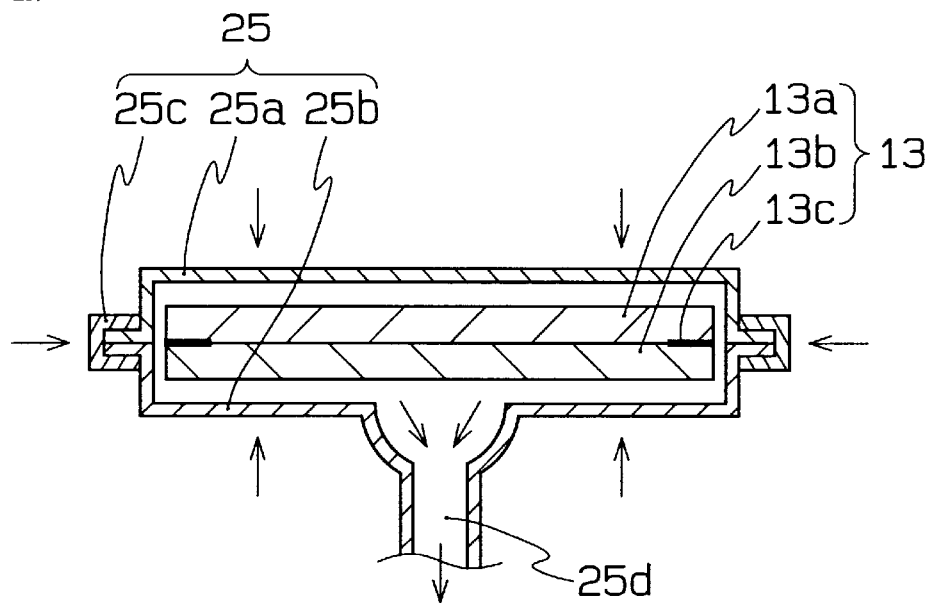
FIGS. 11a–11b is a sectional, explanatory view of processes according to one embodiment of a manufacturing method of a liquid crystal display device according to the eighth aspect of the present invention.
Figure 11B:
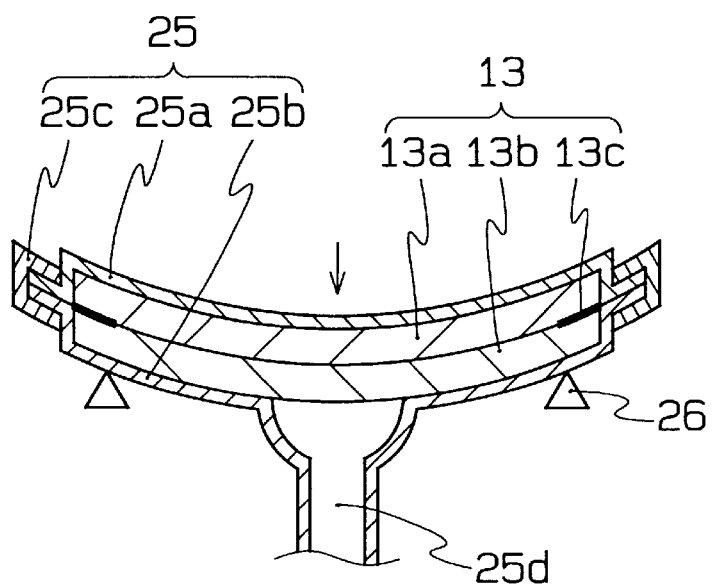
Figure 12:
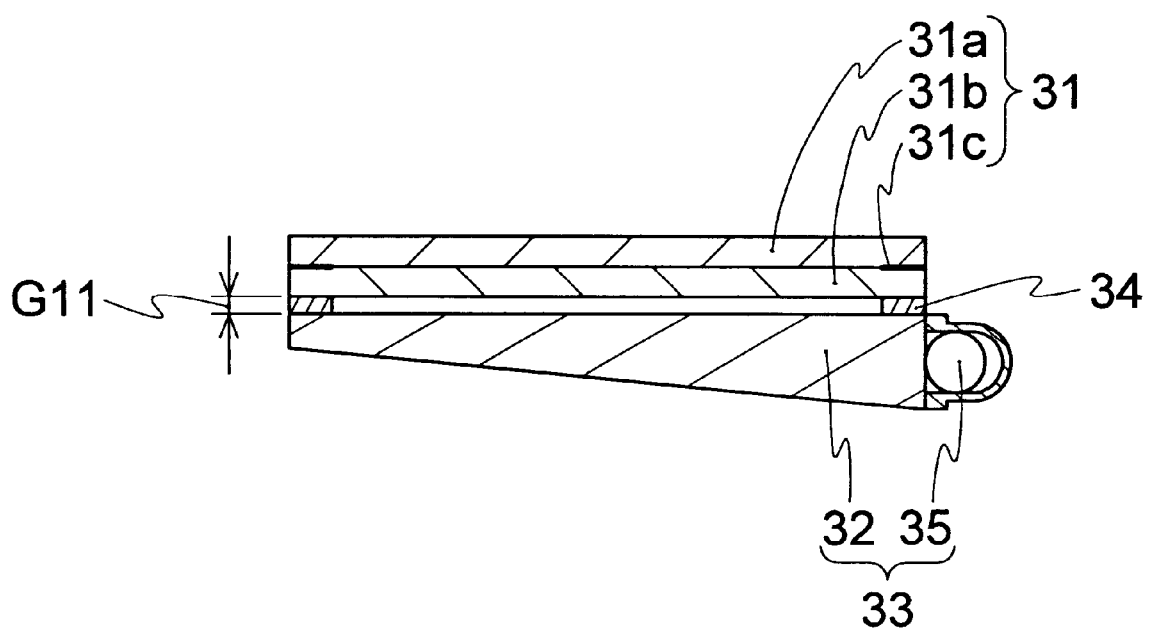
FIG. 12 is a sectional view of a conventional liquid crystal display device.
Figure 13:
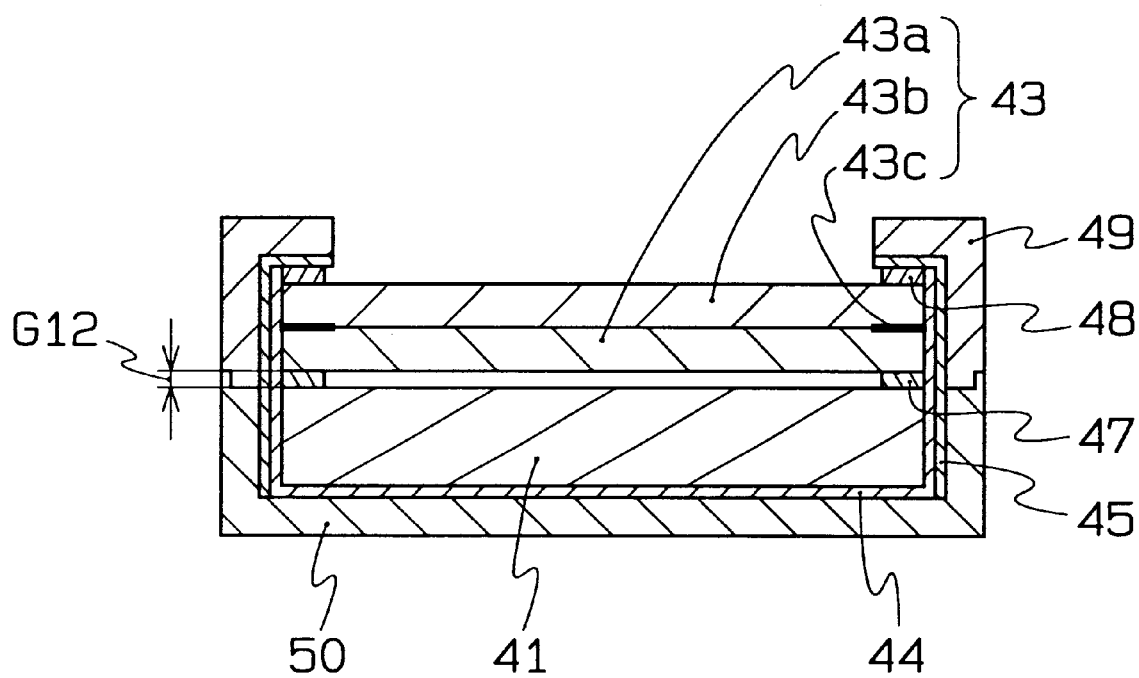
FIG. 13 is a sectional view of another conventional liquid crystal display device.

Further, in a third manufacturing method shown in FIG. 11, the array substrate 13*a* and the color filter substrate 13*b* which are adhered together by means of the sealing member 13*c* are positioned in a sealed sack 25, more particularly, in a sack 25 comprising thin stainless steel plates 25*a*, 25*b* and an O ring 25*c*, and air in the interior of the sack 25 is exhausted to form a substantially vacuum condition via a discharge outlet 25*d* so that the substrates 13*a*, 13B are pressed to each other with sing the shrinking force of the sack 25. Thereafter, the array substrate 13*a* and the color filter substrate 13*b* are made to bow downwardly by their own weight to obtain a liquid crystal display panel 13. At this time, the proximity of the central portion of the liquid crystal display panel 13 can be made to bow in a substantially spherical manner by supporting the peripheral edge of the liquid crystal display panel 13 by an extrusion 26 shaped in a form of a rectangular ring, as shown in FIG. 11 (*b*). Thereafter, by arranging the liquid crystal display panel 13 as well as the light guide plate 11 and the spacers 17, 18 in an outwardly bulged manner with respect to a casing composed of casings 19, 20 as shown in FIG. 7, the liquid crystal display device of FIG. 7 can be obtained. It should be noted that in case the liquid crystal display panel 13 is to be deformed into a substantially spherical shape by means of the extrusion 26, the peripheral edge of the liquid crystal display panel 13 is made to lie substantially in a same plane.

In the third manufacturing method shown in FIG. 11, both, thermal compression and pressing without applying heat but by using UV curable resin can be employed.

In a fourth manufacturing method, the sack 25 (see FIG. 11) and the pin 23 (see FIG. 10) might be simultaneously used. More particularly, the array substrate 13*a* and the color filter substrate 13*b* are positioned in the sealed sack 25, pressing is performed with the interior of the sack 25 being in a substantially vacuum condition, and the array substrate 13*a* and the color filter substrate 13*b* are made to bow upwardly by means of the pin 23 to obtain the liquid crystal display panel 13. Thereafter, by arranging the liquid crystal display panel 13 in an outwardly bulged manner with respect to a casing, the liquid crystal display device of FIG. 7 can be obtained. It should be noted that in case the liquid crystal display panel 13 is to be deformed into a substantially spherical shape by means of the pin 23, the peripheral edge of the liquid crystal display panel 13 is made to lie substantially in a same plane.

Further, in a fifth manufacturing method, the array substrate 13*a* and the color filter substrate 13*b* are positioned in the sealed sack 25 (see FIG. 11), pressing is performed with the interior of the sack 25 being in a substantially vacuum condition, and the array substrate 13*a* and the color filter substrate 13*b* are respectively heated or cooled at different temperatures such that the array substrate 13*a* and the color filter substrate 13*b* are made to bow using the temperature differences to obtain the substantially spherical shaped liquid crystal display panel 13. The array substrate 13*a* might be heated to approximately 120 to 180° C., and the color filter substrate 13*b* to approximately 100 to 160° C. Thereafter, by arranging the liquid crystal display panel 13 as well as the light guide plate 11 and the spacers 17, 18 in an outwardly bulged manner with respect to a casing composed of casings 19, 20 as shown in FIG. 7, the liquid crystal display device of FIG. 7 can be obtained. It should be noted that in case the liquid crystal display panel 13 is to be deformed into a substantially spherical shape by using temperature differences between the two substrates, the peripheral edge of the liquid crystal display panel 13 is made to lie substantially in a same plane.

In the above described manufacturing method, it has been explained for a case in which the array substrate 13*a* is disposed on a lower side, the color filter substrate 13*b* on an upper side, and the color filter substrate 13*b* on an outer side. However, the present invention is not limited to this, and the arrangement might be reversed in which case bending is performed in a reverse direction. That is, the array substrate 13*a* might be in the upper side, the color filter substrate 13*b* in the lower side, and the array substrate 13*a* might be disposed on the outer side.

According to the present invention, the arrangement of outwardly bulging the proximity of the central portion of the substantially spherical shaped liquid crystal display panel makes it possible to prevent display deficiencies (paddling) owing to interference between the liquid crystal display panel and the backlighting unit or between the former and the casing.

Moreover, since no interference exists between the liquid crystal display panel and the backlighting unit or between the former and the casing, sheets such as the diffusing sheet will not be wrinkled, and the brightness of the backlighting unit can be maintained to be uniform.

Further, the arrangement of outwardly bulging the substantially spherical shaped liquid crystal display panel makes it possible to largely improve the rigidity than compared to conventional flat shaped liquid crystal display panels. Thus, a desired rigidity and durability can be secured also when the liquid crystal display panel is made thin.

Especially, in the case where the spaced portion formed between the liquid crystal display panel and the light guide plate is sealed by adhesion or the like, dirt and dust can be prevented from entering the spaced portion, whereby display irregularities can be eliminated.

What is claimed is:

1. A liquid crystal display device comprising a liquid crystal display panel and a light guide plate arranged in a rear side of the liquid crystal display panel, wherein the liquid crystal display panel is of a substantially spherical shape, and the liquid crystal display panel is fitted at a front side of the light guide plate such that a proximity of a central portion of the liquid crystal display panel is outwardly bulged.

2. The liquid crystal display device of claim 1, wherein the proximity of the central portion of the liquid crystal display panel is outwardly bulged by approximately 0.1 to 1.0 mm.

3. The liquid crystal display device of any one of claims 1 and 2, wherein a notched portion is formed in a peripheral edge portion in the front side of the light guide plate for fitting the liquid crystal display panel thereat.

4. The liquid crystal display device of any one of claims 1 and 2, wherein a portion at which the liquid crystal display panel and the notched portion of the light guide plate are fitted is adhered together.

5. A manufacturing method for a liquid crystal display device comprising device comprising a liquid crystal display panel and a light guide plate arranged in a rear side of the liquid crystal display panel, comprising the steps of:

(a) making the liquid crystal display panel shrink by cooling and/or making the light guide plate expand by heating, (b) fitting the liquid crystal display panel at a front side of the light guide plate, and (c) making a proximity of a central portion of the liquid crystal display panel bulge outwardly by returning the liquid crystal display panel and the light guide plate to room temperature.

6. A manufacturing method for a liquid crystal display device comprising a liquid crystal display panel and a light guide plate arranged in a rear side of the liquid crystal display panel, comprising the steps of:

(a) fitting the liquid crystal display panel at a front side of the light guide plate in a flat condition, and (b) making a proximity of a central portion of the liquid crystal display panel bulge outwardly by applying external force by a mechanical element from a peripheral edge portion of the liquid crystal display panel.

7. A manufacturing method for a liquid crystal display device comprising a liquid crystal display panel and a light guide plate arranged in a rear side of the liquid crystal display panel, comprising the steps of:

(a) fitting the liquid crystal display panel at a front side of a light guide plate in a flat condition such that a closed spaced portion is formed between the liquid crystal display panel and the light guide plate, and (b) making a proximity of a central portion of the liquid crystal display panel bulge outwardly by applying pressure to the spaced portion through putting a gas therein.

8. A liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the liquid crystal display panel is of a substantially spherical shape, and a proximity of a central portion of the liquid crystal display panel is outwardly bulged.

9. The liquid crystal display device of claim 8, wherein the proximity of the central portion of the liquid crystal display panel is outwardly bulged by not more than approximately 0.2 mm.

10. A manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are bonded by compression by being pressed onto a pressing plate of which central portion is bulged to obtain a liquid crystal display panel of substantially spherical shape, and the liquid crystal display panel is so disposed as to be bulged to outside a casing.

11. A manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are placed on a flat shaped pressing plate and are bonded by compression by being pressed in an upward direction by a pin through a piercing hole formed on the pressing plate to obtain a liquid crystal display panel of substantially spherical shape, and the liquid crystal display panel is so disposed as to be bulged to outside a casing.

12. A manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are positioned in a sealed sack to be pressed to each other with the interior of the sack being in a substantially vacuum condition, and the array substrate and the color filter substrate are made to bow downwardly by their own weight to obtain a liquid crystal display panel, and in that the liquid crystal display panel is so disposed as to be bulged to outside a casing.

13. A manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are positioned in a sealed sack to be pressed to each other with the interior of the sack being in a substantially vacuum condition, and the array substrate and the color filter substrate are made to bow upwardly by means of a pin to obtain a liquid crystal display panel, and the liquid crystal display panel is so disposed as to be bulged to outside a casing.

14. A manufacturing method for a liquid crystal display device in which a liquid crystal display panel and a backlighting unit arranged in a rear side of the liquid crystal display panel are housed in an interior of a casing, and in which the liquid crystal display panel is composed of an array substrate and a color filter substrate which are bonded together by pressing, wherein the array substrate and the color filter substrate are positioned in a sealed sack to be pressed to each other with the interior of the sack being in a substantially vacuum condition, the array substrate and the color filter substrate are respectively heated or cooled at different temperatures such that the array substrate and the color filter substrate are made to bow using the temperature differences to obtain a substantially spherical shaped liquid crystal display panel, and the liquid crystal display panel is so disposed as to be bulged to outside a casing.

* * * * *